United States Patent [19]

Havenhill et al.

[11] Patent Number: 5,455,397
[45] Date of Patent: Oct. 3, 1995

[54] ZERO REFERENCE ROTATION SENSE INDICATOR

[75] Inventors: Douglas D. Havenhill; John R. Kendig, both of Peoria; Kevin D. Kral, Glendale, all of Ariz.

[73] Assignee: Honeywell Inc., Minneapolis, Minn.

[21] Appl. No.: 171,034

[22] Filed: Dec. 21, 1993

[51] Int. Cl.[6] ................................ H01H 3/16
[52] U.S. Cl. ................................ 200/61.39
[58] Field of Search .................. 200/17 R, 18, 200/31 R, 61, 39, 47

[56] References Cited

U.S. PATENT DOCUMENTS

| | | | |
|---|---|---|---|
| 3,192,335 | 6/1965 | Todd et al. | 200/61.39 |
| 3,233,053 | 2/1966 | Parks | 200/61.39 |
| 3,322,912 | 5/1967 | Kuchta | 200/61.39 |
| 4,112,265 | 9/1978 | Crepeau et al. | 200/31 R |
| 4,247,744 | 1/1981 | Birkle | 200/47 |
| 4,406,934 | 9/1983 | Elszasz | 200/61.39 |
| 4,499,409 | 2/1985 | Bauer | 200/61.39 X |
| 4,762,385 | 6/1987 | Prindle | 342/766 |
| 4,814,743 | 3/1989 | Hanaki | 200/61.39 |
| 4,939,320 | 7/1990 | Graulty | 200/17 R |

FOREIGN PATENT DOCUMENTS 2203593  10/1988  Switzerland .................. H02P 7/100

Primary Examiner—J. R. Scott
Attorney, Agent, or Firm—Charles J. Ungemach

[57] ABSTRACT

In a system which includes a driven shaft that has limited angular rotation capabilities from a start position clockwise and counterclockwise through a common overlapping angular region, a device for enabling the determination of which desired direction the shaft should be rotated from the region in order to return to the start position including a first member connected for motion with the shaft rotation and a second member mounted for independent motion when moved by the first member in a first direction, the second member being held in the start position with motion of the first member in a second direction, and a sensor to sense the presence of the second member in the start position as an indication of the desired direction.

15 Claims, 4 Drawing Sheets

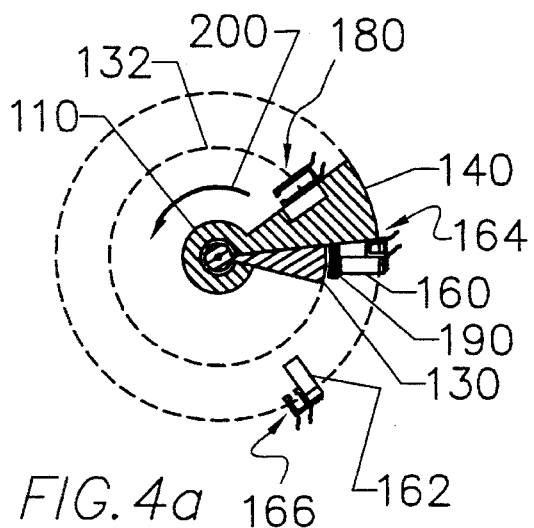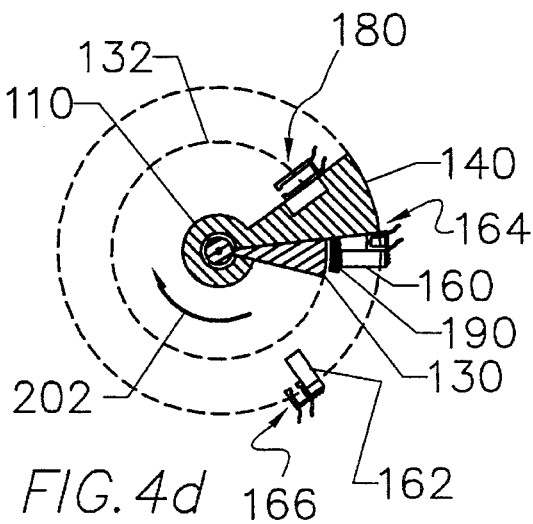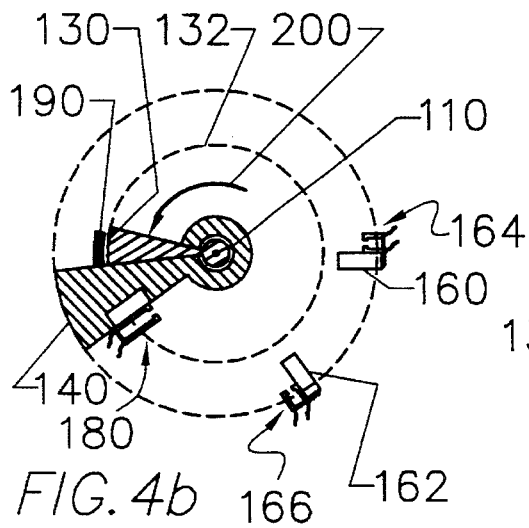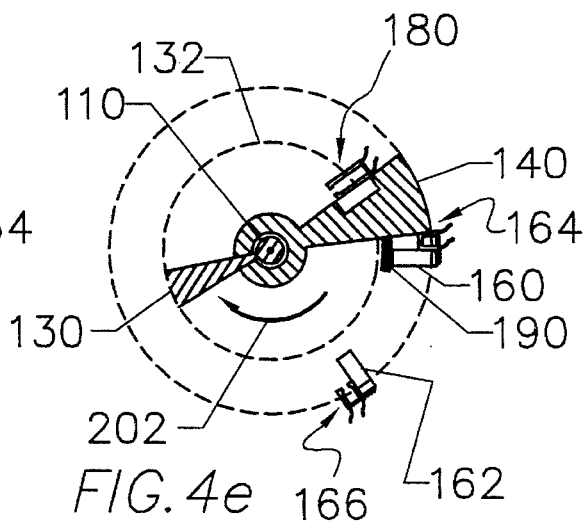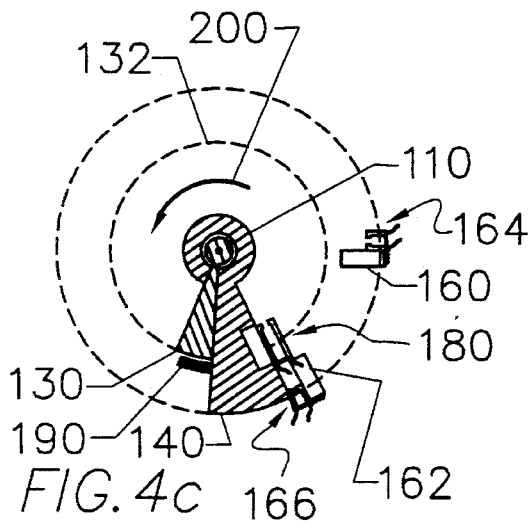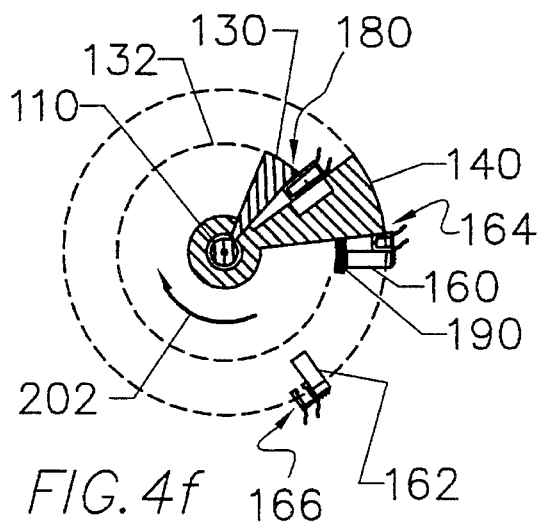

5,455,397

ZERO REFERENCE ROTATION SENSE INDICATOR

BACKGROUND OF THE INVENTION

1. Field of the Invention

The present relates to rotation sensors and, more particularly, to a rotation sensor for use with a shaft which rotates from a start position in either direction and which provides information for the determination of the direction required to return from other positions to the start position.

2. Description of the Prior Art

Apparatus for determining the axial position of a rotary member are well known in the prior art. Applications in which the rotary member has a limited amount of rotation from an intermediate start position in either direction to a limit position are also well known. For example, in radar scanning, it is often desirable to be able to position the antenna in a variety of directions but in order to avoid structures which might lie in the path of the antenna or to avoid continuous rotation, which would then require slip rings to convey the signals to receiving apparatus, shaft rotations of less than, for example one complete rotation from a midpoint or other starting point in either direction may be needed. The apparatus schematically shown in FIGS. 1 and 2 describe such a system. In FIG. 1, a central shaft 10 is mounted for rotation about an axis 12 and may carry a radar antenna (not shown) whose direction is desired to be controlled. For purposes of explanation it will be assumed that the rotation of shaft 12 is desired to be less than two complete rotations (one complete rotation in either direction from a start position proximate to that shown in FIG. 1). A shaft driving means, such as motor 20, receives an input shown as arrow 22, which may be a manual input or the input derived by a computer or the like, and operates to drive shaft 10 clockwise or counter clockwise around axis 12 by means of a mechanical connection shown as dashed line 24.

Connected to shaft 10 and movable therewith is a first arm 30 which is shown in FIG. 1 as a sector but which may be of any configuration desired. As shaft 10 rotates under the direction of motor 20, arm 30 will move about axis 12 so that its remote end describes a circle shown by dashed line 32.

A second arm 40, also shown as a sector but which also may be of any desired configuration, is shown in FIG. 1 to be mounted for independent rotation about axis 12 i.e. it is not connected to be driven by shaft 10. The remote end of arm 40 moves in a circle shown as dashed line 41 and is normally free to move in either direction but includes edges 42 and 43 which extend into the path of arm 30 so that as arm 30 rotates, for example in the clockwise direction, an edge 44 of arm 30 will move into a contact with edge 42 of arm 40 and will thereafter drive it in the clockwise direction. Similarly, when driven in a counterclockwise direction, an edge 46 of arm 30 will move into a contact with edge arm 43 (as it is shown in FIG. 1 ) and will thereafter drive arm 40 in a counterclockwise direction. In FIG. 2 it is seen that arm 30 has moved in the counter clockwise direction to push arm 40 into a position approximately 180 degrees from its position in FIG. 1. This angular position may be measured by any convenient means such as a tachometer or other angle sensor 50 connected to motor 20 by a connection shown as dashed line 52.

In order to prevent rotation of shaft 10 beyond certain predetermined limits, stop members 60 and 62 may be fixedly mounted to a frame and extend into the path 41 of arm 40. Members 60 and 62 are shown carrying switches 64 and 66 to provide signals on output conductors 70 and 71 or 72 and 73 respectively when arm 40 reaches the stop members 60 and 62. Stop members 60 and 62 also are shown carrying springs 74 and 76 respectively to prevent accidental operation of switches 60 and 62 by a freely moving arm 40 before being driven there by arm 30.

As arm 30 turns counter clockwise from the position shown in FIG. 1, and beyond the position shown in FIG. 2, it will drive arm 40 to where it contacts spring 76. Further motion of arm 30 thereafter will cause the end of arm 40 to close switch 66 to send a signal over conductors 72 and 73 to a utilization device such as an indicator or computer (not shown). The utilization device may also be connected to angle sensor 50 to indicate the angular position of shaft 10 and to indicate, when appropriate, the reaching of the counter clockwise limit of rotation provided by switch 66. It may also turn motor 10 off since further clockwise rotation of shaft 10 and arm 20 is prevented by stop member 62. When motor 20 drives in a clockwise direction from, for example, the position shown in FIG. 1, arm 30 will move clockwise through nearly a full turn before the edge 44 of member 30 comes in contact with the edge 42 of arm 40. Thereafter, arm 40 will be driven by arm 30 in a clockwise direction until arm 40 comes in contact with spring 74, compresses it and closes switch 64 sending a signal via conductors 70 and 71 to the utilization device (not shown), to turn off motor 20 and indicate the end of the clockwise rotation of shaft 10.

A difficulty has been encountered with the prior art apparatus shown in FIGS. 1 and 2 when it is desired to determine from any position of the shaft, which direction it must rotate to return to the start position. It can be seen in FIG. 2, for example, that while sensor 50 provides an indication of the angular position (approximately 180 degrees) for shaft 10, it does not know whether this position was reached by clockwise or counter clockwise rotation. Of course, a computer connected to motor 20 could keep track of each and every rotation and its direction but this requires an undesirable amount of memory and is more complicated than desirable.

SUMMARY OF THE INVENTION

BRIEF DESCRIPTION OF THE DRAWING

The present invention provide a means for determining the direction of rotation necessary to return from any angular position of the shaft to the start position without keeping track of the motions of the shaft. In the present invention I provide a holding device such as a magnet on arm 40 of FIG. 1 to hold it against stop 60 until driven away therefrom by sufficient counter clockwise rotation of the arm 30. Accordingly, switch 64 will be closed during all rotations of shaft 10 which are more clockwise than the position shown in FIG. 1. This informs the utilization device that to return to the start position, shaft 10 must be rotated counter clockwise. After arm 30 drives arm 40 away from stop 60, switch 64 will remain open through all rotations of shaft 10 which are more counter clockwise than the position shown in FIG. 1. this informs the utilization device that to return to the start position, shaft 10 must be rotated clockwise. The holding device also allows the removal of the springs 74 and 76 since arm 40 is no longer freely movable and is unlikely to accidentally operate the switches 64 and 66. Since switch 64 no longer provides an indication of the limit of counter clockwise rotation, I also provide a third switch which operates when surface 44 of arm 30 comes in contact with surface 42 of arm 40 to provide the desired indication.

A more complete understanding of the present invention will be obtained upon a reading of the specification and claims taken in connection with the drawings in which

FIGS. 4a–4f are schematic top view representations of the present invention in various angular positions.

DETAILED EXPLANATION OF THE PREFERRED EMBODIMENTS

Figure 3:
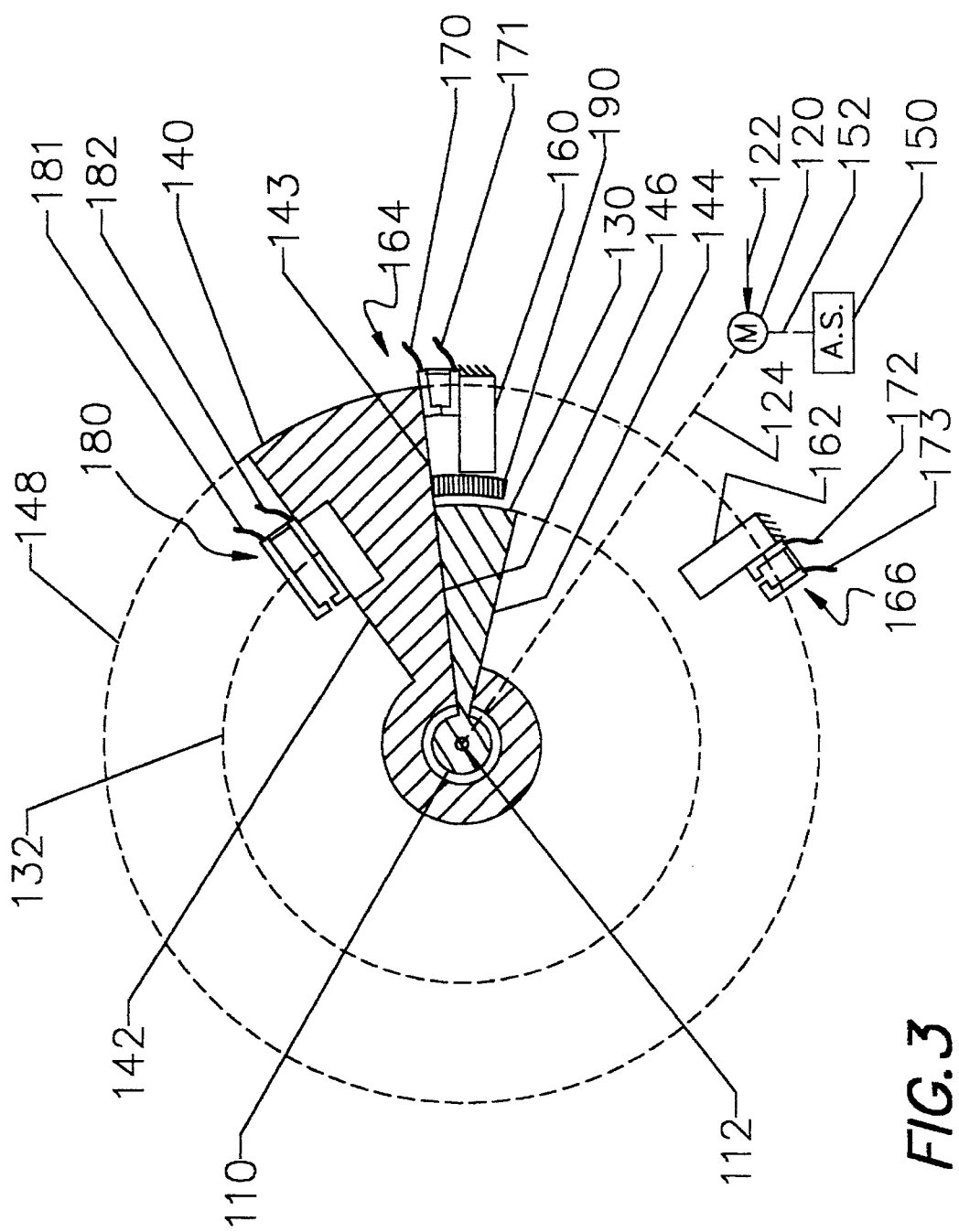
FIG. 3 is a schematic top view of a preferred embodiment of the present invention.

Referring to FIG. 3, a shaft 110, which may carry a radar antenna, is shown rotatable about an axis 112 under the driving force of a motor 120 which receives an input shown by an arrow 122 from a suitable manual device or computer and which drive shaft 110 by a driving mechanism shown as dashed line 124. Shaft 110 is shown carrying a first arm 130 which is shown as a sector but which may be of any desired shape, and rotation of shaft 110 causes arm 130 to move in a circular path shown by dashed line 132. It should be understood, that shaft 110 could be connected to arm 130 by a mechanism such as a rack and pinion mechanism so that arm 30 moved in a straight line or other non circular path. The important feature is that arm 130 moves back and forth with clockwise and counter clockwise rotation of the shaft 12.

A second arm 140, also shown as a sector but which may be of any desirable shape, is shown mounted for rotation about axis 112 but not connected thereto. Arm 140 has a first surface 142 and a second surface 143 which lie within the path of motion of arm 130 so that an edge 144 of arm 130 can move generally into contact with the edge 142 of arm 140, and an edge 146 of arm 130 can move into contact with edge 143 of arm 140, as shown in FIG. 3. The path of motion of arm 140 is a circle shown by dashed line 148, but it too may be arranged to move in non circles or straight lines. The important feature of arm 140 is that in includes means such as the surfaces 142 and 143 lying in the path of arm 130 so that it is capable of being driven in accordance therewith.

The angular position of shaft 110 can be determined by a suitable angle sensor 150, connected to motor 120 by a mechanical connection shown as dashed line 152. Sensor 150 may be a tachometer or any other device known in the prior art to sense angular position.

Figure 1:
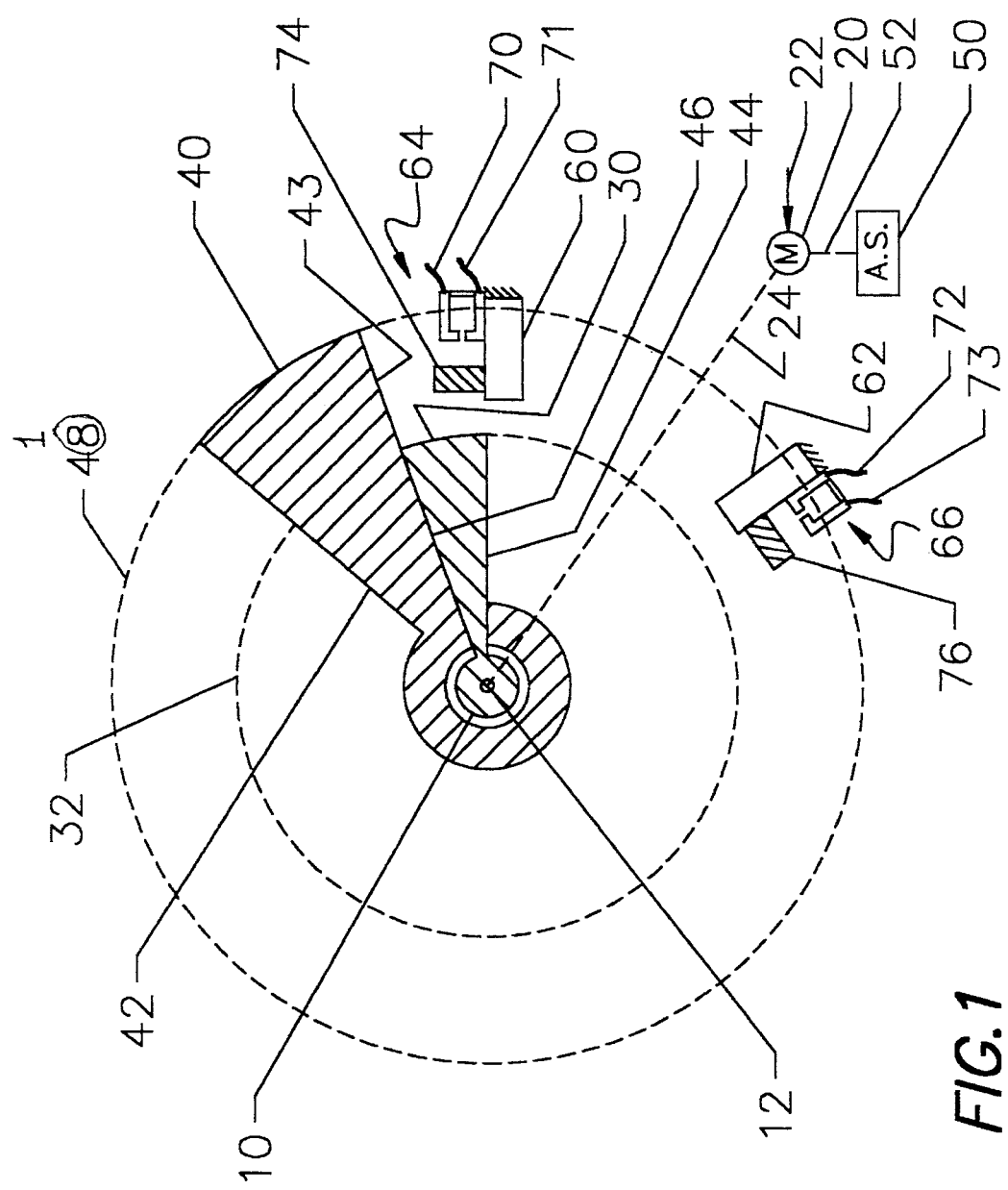
FIG. 1 is a schematic top view of the prior art apparatus in a first position.
Figure 2:
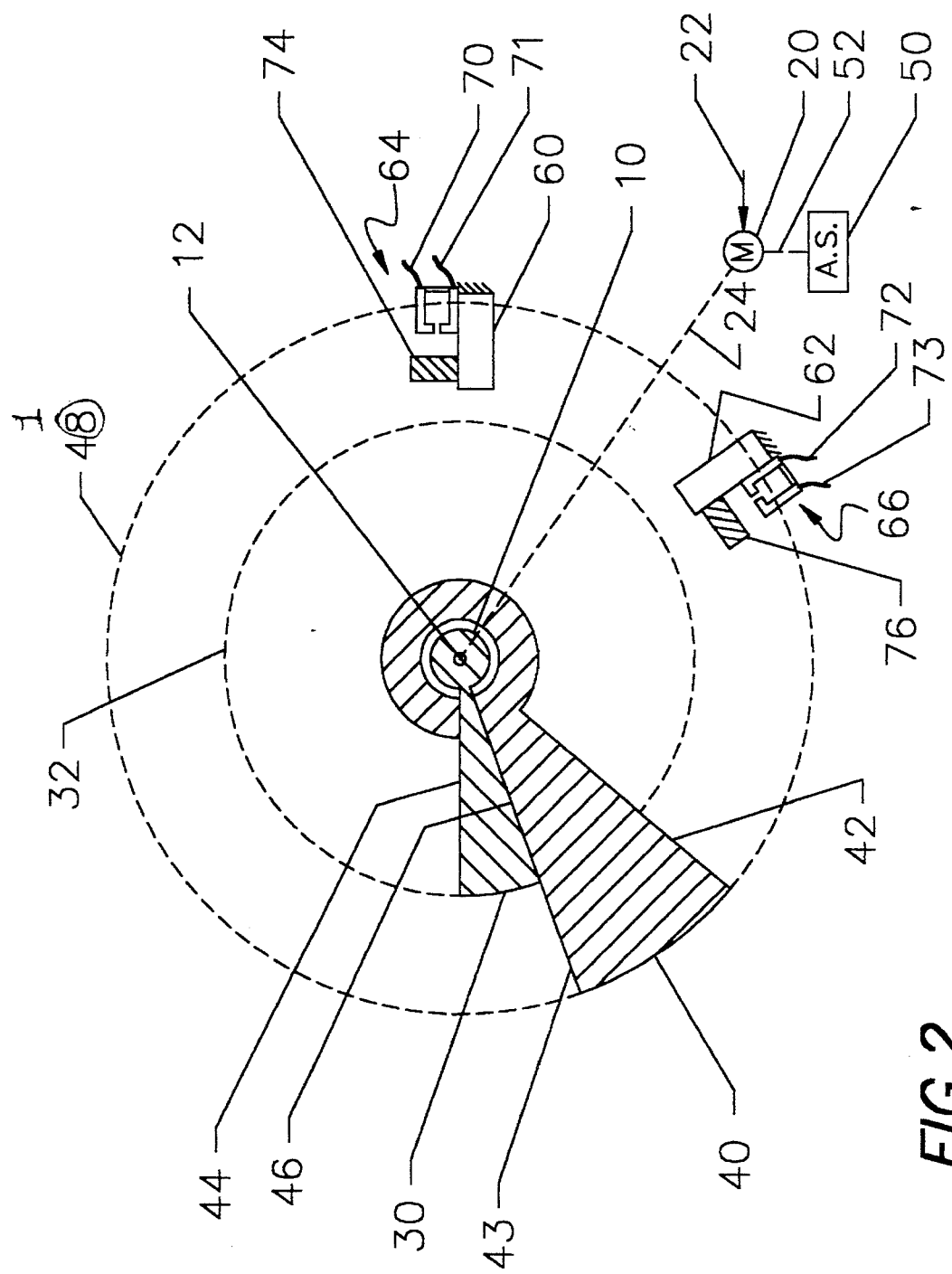
FIG. 2 is a schematic top view of the prior art apparatus in a second angular position.

As was the case in connection with FIGS. 1 and 2, a pair of stop members 160 and 162 are shown fixedly mounted to a frame and extend into the path of rotating arm 140. Stop member 160 carries a switch 164 and stop member 162 carries a switch 166. Switches 164 and 166 are normally open but will be closed by the contact of arm 140 therewith during arm 140's travel around path 148. The opened or closed condition of switches 164 and 166 are fed to a utilization device (not shown), which may be computers or indicators, by conductors 170, 171, 172 and 173. To this point, the apparatus describe in connection with FIG. 3 is substantially the same as the apparatus describe in connection with FIGS. 1 and 2 except that the springs 74 and 76 mounted on members 60 and 62 in FIG. 1 are not needed in the embodiment of FIG. 3, as will be explained.

A third switch 180 is shown mounted along the edge 142 of arm 140 and may also be connected to an appropriate utilization device such as an indicator or computer (not shown) by conductors 181 and 182. As will be understood, switch 180 could also be mounted on surface 144 of arm 130. Finally, an interlocking member, such as a magnet 190, is shown mounted on arm 140 and extends out of surface 143 between stop member 160 and arm 130. The purpose of arm interlocking member or magnet 190 is to hold arm 140 in a position which closes switch 164 until it is pushed in a counterclockwise direction by member 130, causing magnet 190 to move away from member 160. Magnet 190 will also interact with arm 130 to hold arm 140 to arm 130 during all clockwise and counterclockwise rotations of arm 130 which are counterclockwise of the position in FIG. 3. Magnet 190 thus prevents arm 140 from moving freely and thus minimizes any chance that it could accidentally move to close any of the switches even though it is subjected to minor exterior forces.

It will be seen in connection with FIG. 3 that, as arm 130 moves in a counterclockwise direction, it pushes arm 140 with it around the circle 148 until such time as arm 140 contacts and closes switch 166, thereby producing an output to the utilization device and indicating the limit of counterclockwise rotation has been reached and turning off motor 120. During all of this rotation, the arm 140 is maintained in a position adjacent arm 130 by the magnet 190 co-acting with arm 130.

During clockwise rotation of arm 130, arm 140 will move until it contacts and closes switch 164. This does not, however, constitute the end of the clockwise rotation of arm 130 (as was the case in connection with FIGS. 1 and 2) and switch 164 does not supply an end-of-rotation signal because arm 130 may continue with further clockwise rotation around the circle 132 until it finally comes into contact with the switch 180, closing it. Switch 180 constitutes the limit switch and, upon closing, a signal on conductors 181 and 182 to the utilization device will provide an indication of the limit of clockwise rotation and will stop motor 120.

As will be explained below, the position of arm 130 is now unambiguous since it can always be determined, from the opened or closed condition of switch 164, whether or not shaft 110 has to be rotated clockwise or counterclockwise to go back to the starting position. For a better understanding of this, reference should be had to FIGS. 4a–4f. In FIG. 4a, arms 130 and 140 are shown in the position they occupy in FIG. 3, which may be considered the zero or starting position. It will be noted that switch 164 is closed and switches 166 and 180 are opened. As shaft 110 and arm 130 begin rotating in a counterclockwise direction as shown by arrow 200, arm 140 will be pushed counterclockwise, overcoming the force between magnet 190 and stop member 160. Magnet 190 will hold arms 140 and 130 together for all clockwise and counter clockwise rotations of shaft 110 until shaft 110 rotates arm 130 clockwise further than in FIG. 4a.

FIG. 4b shows a counter clockwise rotation of about 180 degrees. Continued rotation in the counterclockwise direction 200 will result in the position shown in FIG. 4c, where arm 140 has been pushed into contact with switch 166, thereby closing it to provide an indication that the counterclockwise limit of rotation has been reached. In FIGS. 4b–c, switch 164 is seen to be open and this indicates that the shaft 110 needs to be rotated in a clockwise direction to reach the zero or start position.

In FIG. 4d, the elements again occupy the position shown in FIG. 3, i.e. the zero or start position, but now shaft 10 will be rotated in a clockwise direction shown by arrow 202. As shaft 110 moves in the clockwise direction 202, arm 130 will be pulled free of its interaction with the magnet 190 and will begin to move alone around the circle 132. Magnet 190 will now interact with stop member 160 so as to cause arm 140 to continue to close switch 164.

After the shaft 110 has rotated approximately 180 degrees in the clockwise direction it reaches the position shown in FIG. 4e. It is seen that switches 166 and 180 are open and switch 164 is closed. Further clockwise rotation of shaft 110 brings arm 130 to the position shown in FIG. 4f where arm 130 closes switch 180 to indicate that the limit of clockwise rotation has been reached. In FIGS. 4d–f, switch 164 is seen to be closed and this indicates that the shaft 110 needs to be rotated in a counter clockwise direction to reach the zero or starting position.

Thus, in all cases, the desired direction of rotation of shaft 110 to return to the start position is known by the open or shut condition of switch 164 and the desired result has been accomplished with simple straight forward means and without keeping track of each motion of the shaft 110. Of course, many changes will occur to those skilled in the art without departing from the scope of the present invention. For example, while double pole single throw switches have been shown, other types of limit indicating devices such as light operating sensors may be employed. Also, normally open switches may be normally closed instead. Also, where the expression "clockwise" and "counter clockwise" have been used, the opposite directions may be employed. Accordingly I do not wish to be limited to the disclosures used in connection with the description of the preferred embodiment but intend only to be limited by the appended claims.

I claim:

1. Apparatus of the class described comprising in combination:

a shaft mounted for clockwise and counterclockwise rotation about a first axis between first and second limit positions;

a first member connected to the shaft and movable forward and backward along a first path in accordance with clockwise and counterclockwise rotation of the shaft;

a second member mounted for independent motion in a second path movable by the first member in a first direction when the first and second members occupy a first relative position and movable by the first member in a second direction when the first and second members occupy a second relative position, the second path having first and second extremity positions corresponding to the first and second limits of rotation of the a first position sensor mounted so as to provide a first signal when the first and second members are in the first relative position;

a first stop member mounted proximate the first extremity position of said second path and operable to restrain the second member from further motion in the first direction and thereafter to prevent further forward motion of the first member when the first and second members occupy the first relative position; and a second stop member mounted proximate the second extremity position of said second path and operable to restrain the second member from further motion in the second direction and thereafter to prevent further backward motion of the first member when the first and second members occupy the second relative position.

2. Apparatus according to claim 1, further including a second position sensor mounted so as to provide a second signal when the second member is proximate the first stop member.

3. Apparatus according to claim 2, further including a third position sensor mounted so as to provide a third signal when the second member is proximate the second stop member.

4. Apparatus according to claim 1, further including holding means to retain the second member proximate the first extremity position until moved in the second direction by the first member.

5. Apparatus according to claim 4, wherein the holding means operates to retain the second member proximate the first member after the first member moves the second member away from the first extremity position.

6. Apparatus according to claim 5, further including rotation sensing means to provide a signal indicative of the rotational position of the shaft.

7. Apparatus according to claim 6, wherein simultaneous provision of the first and second signals indicates the shaft has reached the first limit position.

8. Apparatus according to claim 7, wherein provision of the third signal indicates the shah has reached the second limit position.

9. Apparatus according to claim 2, wherein provision of the second signal, when the first and second members occupy the second relative position, constitutes a start position and, at any position of the shaft between the first and second limits, the direction of rotation necessary to return to the start position is determined by whether or not the second position sensor is producing the second signal.

10. Apparatus according to claim 8, wherein provision of the second signal, when the first and second members occupy the second relative position, constitutes a start position and, at any position of the shaft between the first and second limit positions, the direction of rotation necessary to return to the start position is determined by whether or not the second position sensor is producing the second signal.

11. Apparatus according to claim 10, wherein the first, second and third position sensors are switches having open and closed states, and the first, second and third signals are provided when the switches change state.

12. Apparatus for use with a shaft which is rotatable from a start position in first and second directions about an axis to first and second rotational limit positions for providing a determination of the direction, the shaft should be rotated from any position between the first and second limit position to the start position, comprising:

a first member rotatable with the shaft about the axis, the first member having first and second surfaces;

a second member freely rotatable about the axis in a path between first and second stop members, the second member having third and fourth surfaces, the first surface contacting the third surface at a first relative position of the first and second members, the first member thereafter driving the second member in a first direction about the axis to the first stop member where the first and second members are stopped, and the second surface contacting the fourth surface at a second relative position of the first and second members, the first member thereafter driving the second member in a second direction about the axis to the second stop member where the first and second members are stopped;

first switch means mounted on the first stop member to close when the second member is proximate the first stop member; and holding means mounted on the second member so that the second member remains proximate the first stop member until driven in the second direction by the first member, at any position of the first member, the direction of travel necessary to return to the start position being indicated by whether the first switch means is open or closed.

13. Apparatus according to claim 12, further including second switch means mounted on the second stop member to close when the second member is proximate the second stop member, and third switch means mounted between the first and second members to close when the first and second members are in the first relative position.

14. Apparatus according to claim 12, further including releasable holding means mounted on the second member to retain the second member proximate the first stop member and driven away therefrom by the first member and to thereafter hold the first and second members in the second relative position.

15. Apparatus according to claim 14, further including shaft position sensing means to provide an indication of the angular position of the shaft.

* * * * *

UNITED STATES PATENT AND TRADEMARK OFFICE
CERTIFICATE OF CORRECTION

PATENT NO.   : 5,455,397
DATED        : October 3, 1995
INVENTOR(S)  : Douglas D. Havenhill, John R. Kendig and Kevin D. Kral It is certified that error appears in the above-indentified patent and that said Letters Patent is hereby corrected as shown below:

Column 5, line 53 insert "shaft;"after --rotation of the--

Signed and Sealed this

Twentieth Day of February, 1996

Attest:

BRUCE LEHMAN

Attesting Officer

Commissioner of Patents and Trademarks